United States Patent

Yamasaki

[11] Patent Number: 6,087,814
[45] Date of Patent: *Jul. 11, 2000

[54] POWER SOURCE CIRCUIT AND ELECTRONIC DEVICE WITH THE SAME

[75] Inventor: Koichi Yamasaki, Kyoto, Japan

[73] Assignee: Rohm Co., Ltd., Kyoto, Japan

[*] Notice: Under 35 U.S.C. 154(b), the term of this patent shall be extended for 533 days.

[21] Appl. No.: 08/519,952

[22] Filed: Aug. 28, 1995

[30] Foreign Application Priority Data

Aug. 30, 1994 [JP] Japan ..................................... 6-205549
Nov. 24, 1994 [JP] Japan ..................................... 6-289663

[51] Int. Cl.$^7$ ....................................................... G05F 1/40
[52] U.S. Cl. ........................................... 323/282; 323/285
[58] Field of Search .................................... 323/282, 283, 323/284, 285, 286, 287, 288

[56] References Cited

U.S. PATENT DOCUMENTS 4,812,959  3/1989  Driscoll et al. ............................ 363/20

*Primary Examiner*—Shawn Riley
*Assistant Examiner*—Bao Q. Vu
*Attorney, Agent, or Firm*—BakerBotts, LLP

[57] ABSTRACT

A power source circuit of the switching stabilizing power source type, which is adaptable for portable television sets, video tape recorders, telephone sets, and the like. In the power source circuit, the oscillating operation of an oscillator circuit is synchronized with a reference clock signal of an external circuit. Because of this, the beat noise that is due to the fact that the noise unremovable by smoothing circuits is not synchronized with the reference clock signal can be removed. As a result, no deterioration of the external circuit characteristics, no erroneous operation of the power source circuit, and improvement of the reliability of the power source circuit are ensured. Further, since the oscillator circuit generates a triangle wave voltage, the triangle wave voltage contains a less noise by harmonic components than that of a saw-tooth wave voltage.

18 Claims, 3 Drawing Sheets

FIG. 1
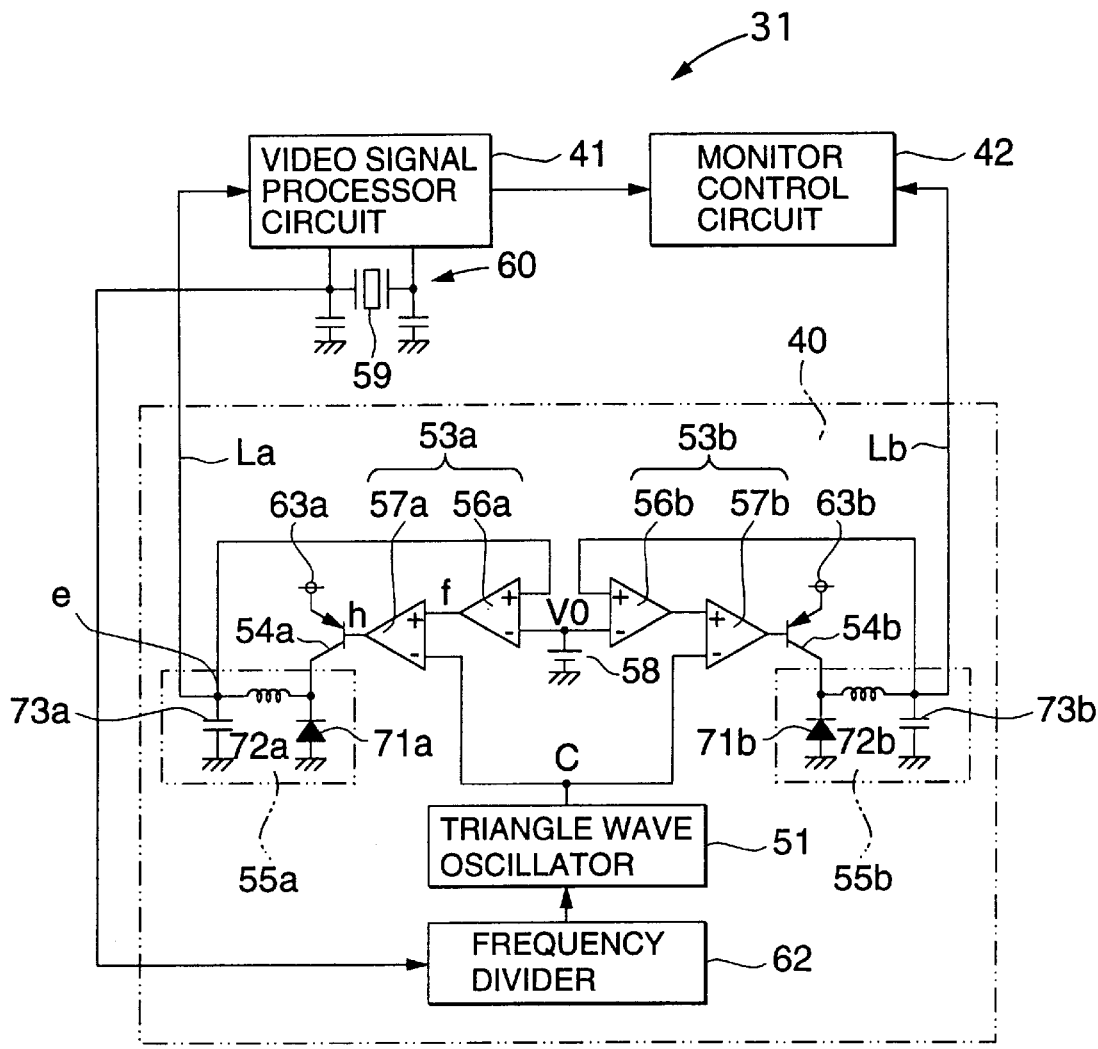
FIG. 2 (a)
FIG. 2 (b)
FIG. 2 (c)
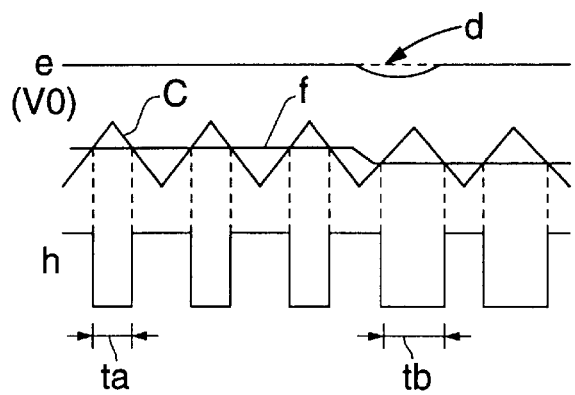

FIG. 3
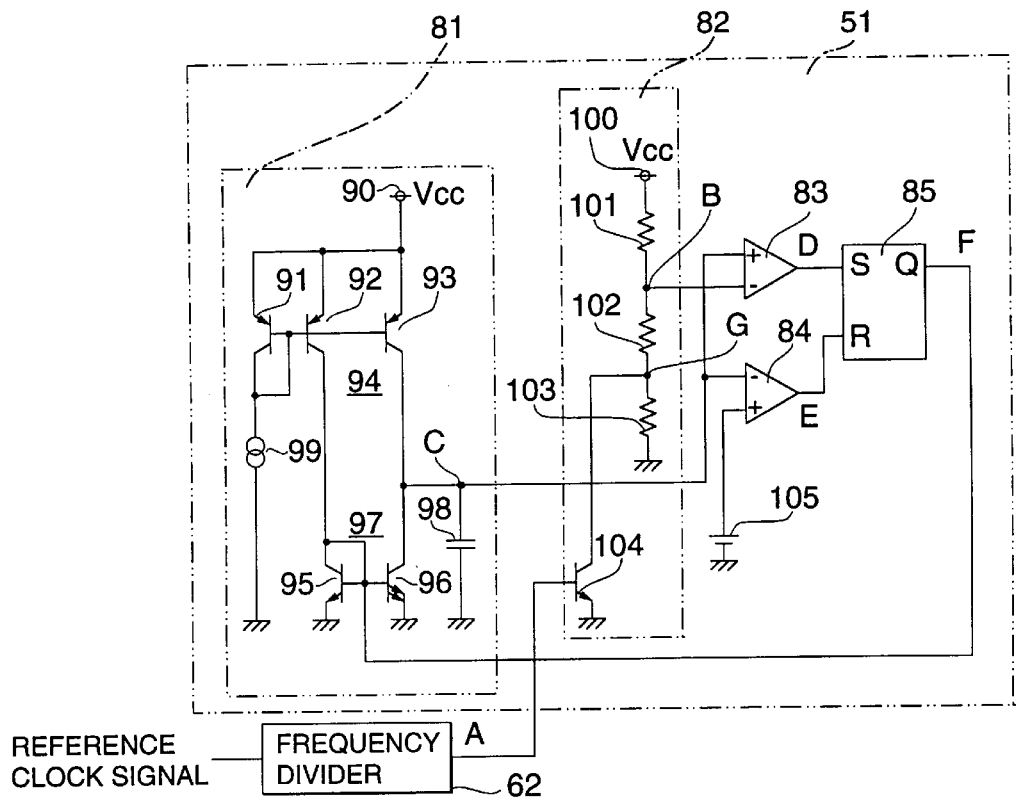
REFERENCE CLOCK SIGNAL → FREQUENCY DIVIDER — 62
FIG. 4 (a) A
FIG. 4 (b) B
FIG. 4 (c) C
FIG. 4 (d) D
FIG. 4 (e) E
FIG. 4 (f) F
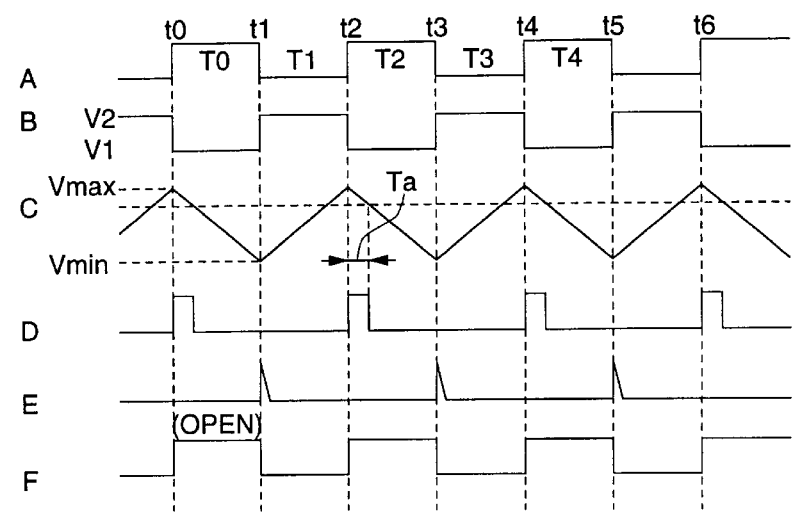

POWER SOURCE CIRCUIT AND ELECTRONIC DEVICE WITH THE SAME

BACKGROUND OF THE INVENTION

1. Field of the Invention

The present invention relates to a power source circuit of the switching stabilizing power source type, which is adaptable for portable television sets, video tape recorders, telephone sets, and the like. Further, the invention relates to an electronic device using such a power source circuit.

2. Discussion of the Related Art

In electronic devices, such as portable TV sets, video tape recorders, and telephone sets, it is a common practice to use a power source circuit of the switching stabilizing power source type, in order to secure a stable operation thereof.

FIG. 5 is a circuit diagram showing an arrangement of a peripheral circuit of a power source of a portable video tape recorder (VTR) 1.

The VTR 1 is made up of a power source circuit 10 of the switching stabilizing power source type, a video signal processor circuit 11 for processing an input video signal, and a monitor control circuit 12 for controlling a monitor screen. The video signal processor circuit 11 and the monitor control circuit 12 are supplied with electric power from the power source circuit 10, through power lines La and Lb.

The power source circuit 10 is composed of a triangle wave oscillator 21 for generating a triangle wave voltage, pulse width control circuits 23a and 23b provided in association with the power lines La and Lb, switching transistors 24a and 24b, and smoothing circuits 25a and 25b. The pulse width control circuit 23a includes two comparators 26a and 27a, and the pulse width control circuit 23b also includes two comparators 26b and 27b.

The arrangement of a circuit associated with the power line La of the power source circuit 10, and the operation of the circuit will be described.

The comparator 26a of the pulse width control circuit 23a compares an output voltage of the smoothing circuit 25a with a reference voltage of a reference power source 28. The comparator 27a compares an output voltage of the comparator 26a with a triangle wave voltage outputted from the triangle wave oscillator 21. The width of a pulse signal is controlled by the result of the comparison, and the width-controlled pulse signal is applied to the switching transistor 24a. The smoothing circuit 25a smoothes an output signal of the switching transistor 24a when it is switched. The thus stabilized power source voltage is supplied to the power line La.

The arrangement of the circuit associated with the power line La and its operation that have been described above, are correspondingly applied to those of a circuit associated with the power line Lb. In this way, the stabilized power source voltage is applied to the video signal processor circuit 11 and the monitor control circuit 12.

In the power source circuit 10 of the switching stabilizing power source type, the smoothing circuits 25a and 25b imperfectly smooth the output signals of the switching transistors 24a and 24b, respectively. As a result, noise synchronized with the switching operations of the switching transistors 24a and 24b are contained in the power source voltages of the smoothing circuits 25a and 25b, respectively. The noise enters into the video signal processor circuit 11 and the monitor control circuit 12. This results in reduction of the S/N ratio, and increase of residual noise, and eventually deteriorates the characteristics of the VTR.

For the operation of the video signal processor circuit 11, a reference clock signal is a clock signal outputted from an oscillator 29 oscillating at 3.58 MHz. The reference clock signal is not synchronized with the noise that is synchronized with the switching operation of the transistor. Because of this, a beat noise is frequently generated.

SUMMARY OF THE INVENTION

Accordingly, an object of the present invention is to provide a power source circuit which removes adverse effects by the noise generated in the power source circuit to the external circuit.

Another object of the present invention is to provide an electronic device using a power source circuit which removes adverse effects by the noise generated in the power source circuit to the external circuit.

According to the present invention, there is provided a power source circuit including: an oscillator circuit for outputting a triangle wave voltage; a pulse width control circuit for comparing the triangle wave voltage outputted from the oscillator circuit with a reference voltage, and for controlling a width of a pulse signal to be outputted in accordance with a result of the comparison; a switching circuit being switched in accordance with the pulse signal outputted from the pulse width control circuit; and a smoothing circuit for smoothing an output signal of the switching circuit, and for applying the smoothed output signal as a power source voltage to an external circuit, and as the reference voltage to the pulse width control circuit, wherein an oscillating operation of the oscillator circuit is synchronized with a reference clock signal of the external circuit.

Further, there is also provided an electronic device including a power source circuit and a synchronizing circuit which is supplied with power from the power source circuit and operates in accordance with a reference clock signal, the power source circuit including: an oscillator circuit for outputting a triangle wave voltage; a pulse width control circuit for comparing the triangle wave voltage outputted from the oscillator circuit with a reference voltage, and for controlling a width of a pulse signal to be outputted in accordance with a result of the comparison; a switching circuit being switched in accordance with the pulse signal outputted from the pulse width control circuit; and a smoothing circuit for smoothing an output signal of the switching circuit, and for applying the smoothed output signal as a power source voltage to an external circuit, and as the reference voltage to the pulse width control circuit, wherein an oscillating operation of the oscillator circuit is synchronized with a reference clock signal of the synchronizing circuit.

BRIEF DESCRIPTION OF THE DRAWINGS

Other objects, features, and advantages of the present invention will be apparent from the following detailed description in connection with the accompanying drawings, in which:

FIG. 1 is a circuit diagram showing the arrangement of an embodiment of the present invention;

FIGS. 2(a) to 2(c) are diagrams showing a set of waveforms for explaining the operation of the embodiment shown in FIG. 1;

FIG. 3 is a circuit diagram showing the arrangement of a triangle wave oscillator used in the embodiment shown in FIG. 1;

FIGS. 4(a) to 4(f) are timing charts showing the operation of the triangle wave oscillator shown in FIG. 3.

DETAILED DESCRIPTION OF THE PREFERRED EMBODIMENT

Figure 5:
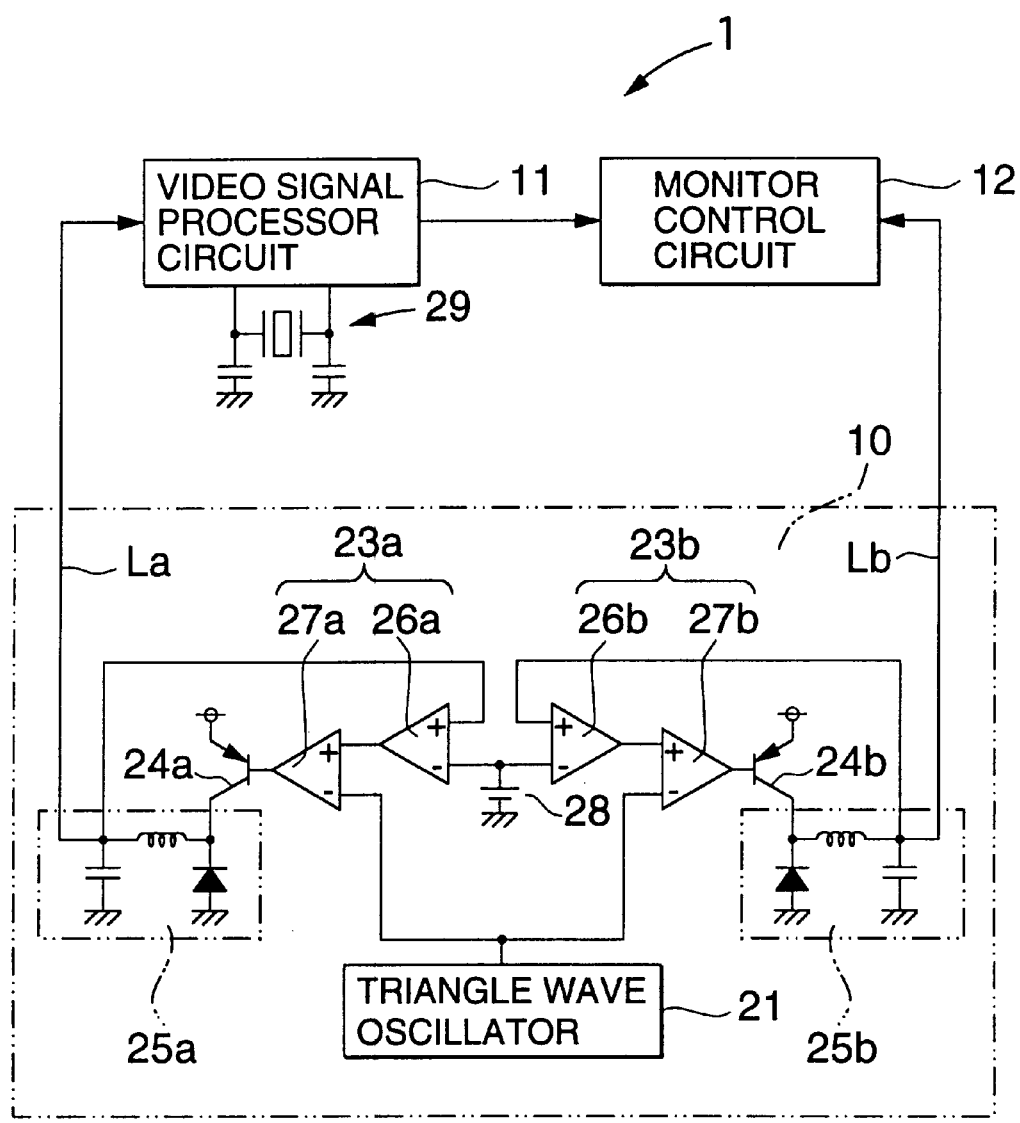
FIG. 5 is a circuit diagram showing the arrangement of a conventional power source circuit.

FIG. 1 is a circuit diagram showing the arrangement of an embodiment of the present invention. In the embodiment, the present invention is applied to a portable video tape recorder (VTR) 31.

The VTR 31 includes a power source circuit 40 of the switching stabilizing power source type, a video signal processor circuit 41 for processing an input video signal, and a monitor control circuit 42 for controlling a monitor screen. A video signal is processed by the video signal processor circuit 41, and applied to the monitor control circuit 42. The video signal processor circuit 41 and the monitor control circuit 42 are supplied with electric power from the power source circuit 40, through power lines La and Lb. In the description of the present embodiment, the video signal processor circuit 41 is treated as a synchronizing circuit.

The power source circuit 40 includes a triangle wave oscillator 51 for generating a triangle wave voltage, pulse width control circuits 53a and 53b provided in association with the power lines La and Lb, switching transistors 54a and 54b, smoothing circuits 55a and 55b, and a frequency divider 62. The pulse width control circuit 53a includes two comparators 56a and 57a, and the pulse width control circuit 53b also includes two comparators 56b and 57b.

A clock signal for the operation of the video signal processor circuit 41 is a clock signal at 3.58 MHz outputted from an oscillator 60 with a resonator 59. The reference clock signal from the oscillator 60 is applied to the frequency divider 62 where its frequency is quartered. The output signal from the frequency divider 62 is applied to the triangle wave oscillator 51.

The arrangement of a circuit associated with the power line La of the power source circuit 40, and the operation of the circuit will be described.

The comparator 56a of the pulse width control circuit 53a compares an output voltage e of the smoothing circuit 55a with a reference voltage Vo of a reference power source 58. The comparator 57a compares an output voltage f of the comparator 56a with a triangle wave voltage C outputted from the triangle wave oscillator 51. The width of a pulse signal h outputted from the comparator 57a is controlled by the result of the comparison, and the width controlled pulse signal h is applied to the switching transistor 54a. The smoothing circuit 55a smoothes an output signal of the switching transistor 54a when it is switched. The thus stabilized power source voltage is supplied to the power line La.

The switching transistor 54a is a PNP transistor in the present embodiment. As shown, the emitter of the switching transistor 54a is connected to a power source 63a, and the collector thereof is connected to the smoothing circuit 55a. The pulse width control circuit 53a applies a pulse signal h to the base of the switching transistor 54a. In response to the pulse signal h, the switching transistor 54a is switched. With the switching operation of the transistor, a power source voltage is interruptedly applied from the power source 63a to the smoothing circuit 55a through the emitter-collector path of the transistor.

The smoothing circuit 55a includes a Schottky diode 71a, a choke coil 72a, and a capacitor 73a. The cathode of the Schottky diode 71a is connected to the collector of the switching transistor 54a, and a first end of the choke coil 72a. The anode of the Schottky diode 71a is grounded. A second end of the choke coil 72a is grounded through the capacitor 73a. The second end of the choke coil 72a is also connected to the power line La, and to the non-inverting input terminal of the comparator 56a. The output voltage e derived from a node between the choke coil 72a and the capacitor 73a is applied as a power source voltage to the power line La, and as a reference voltage to the non-inverting input terminal of the comparator 56a.

FIGS. 2(a) to 2(c) are diagrams showing a set of waveforms for explaining the operation of the power source circuit thus arranged.

FIG. 2(a) shows a variation of the output voltage e of the smoothing circuit 55a. FIG. 2(b) shows a variation of the output voltage f of the comparator 56a, and a variation of the triangle wave voltage C from the triangle wave oscillator 51. FIG. 2(c) shows a variation of the pulse signal h from the comparator 57a. As seen from FIGS. 2(b) and 2(c), when the triangle wave voltage C is larger than the output voltage f, the pulse signal h from the comparator 57a goes low (L) in logical level. The pulse signal h of an L level turns on the switching transistor 54a, which in turn allows the power source voltage from the power source 63a to go to the smoothing circuit 55a. On the other hand, when the triangle wave voltage C is smaller than the output voltage f, the pulse signal h goes high (H). The pulse signal h of an H level turns off the switching transistor 54a, which in turn prohibits the power source voltage from going to the smoothing circuit 55a. Thus, the quantity of the power source voltage from the power source 63a to the smoothing circuit 55a is proportional to the width of the pulse signal h of the L level.

When the output voltage e of the smoothing circuit 55a drops as designated by reference character d FIG. 2(a), the output voltage f of the comparator 56a correspondingly drops (FIG. 2(b)). As a result, the pulse width tb of the pulse signal h of the L level becomes larger than that ta of the pulse signal of the L level in a normal state (FIG. 2(c)). Then, the output voltage e somewhat rises. Thus, the output voltage e is controlled so as to be constant at all times.

The arrangement of the circuit associated with the power line La and its operation that have been described above, are correspondingly applied to those of a circuit associated with the power line Lb. The elements in the circuit associated with the power line Lb are designated by like reference numerals with b attached thereto.

In this way, the stabilized power source voltage is applied to the video signal processor circuit 41 and the monitor control circuit 42.

FIG. 3 is a circuit diagram showing the arrangement of the triangle wave oscillator 51 used in the power source circuit of FIG. 1. FIGS. 4(a) to 4(f) are timing charts showing the operation of the triangle wave oscillator of FIG. 3.

The triangle wave oscillator 51 includes a charge/discharge circuit 81 for producing the triangle wave voltage C through alternate charging and discharging operations thereof, a reference voltage switching circuit 82 for switching one reference voltage to the other and vice versa, first and second comparators 83 and 84, and a flip-flop 85 for controlling the charge/discharge circuit 81 in accordance with the output signals of the first and second comparators 83 and 84.

The charge/discharge circuit 81 includes a first current-mirror circuit 94 including three PNP transistors 91, 92 and 93, a second current-mirror circuit 97 including two NPN transistors 95 and 96, and a charge/discharge capacitor 98. The emitter area of the transistor 96 is set to be two times as large as that of the transistor 95. The emitters of the transistors 91, 92 and 93 are connected together to a power source 90, and the bases of these transistors are connected to one another. The base and the collector of the transistor 91 are connected to each other, and the collector thereof is grounded through a constant current source 99. The collectors of the transistors 92 and 93 are connected to the collectors of the transistors 95 and 96, respectively. The collector and the base of the transistor 95 are interconnected. The bases of the transistors 95 and 96 are interconnected, and the emitters of these transistors are grounded. The collector of the transistor 96 is grounded by way of the charge/discharge capacitor 98.

The reference voltage switching circuit 82 includes three resistors 101, 102 and 103 that are connected in series between a power source 100 and ground, and an NPN transistor that operates in response to a clock signal from the frequency divider 62. The transistor 104 is connected at the collector to a node G between the resistors 102 and 103, and at the emitter to ground. The clock signal A obtained by quartering the reference clock signal in frequency in the frequency divider 62 is applied to the base of the transistor 104.

The non-inverting input terminal of the first comparator 83 is connected Lo a node C between the charge/discharge capacitor 98 and the transistor 96, while the inverting input terminal thereof is connected to a node B between the resistors 101 and 102. The inverting input terminal of the second comparator 84 is connected to the node C, while the non-inverting input terminal thereof is connected to a reference power source 105.

The output signals D and E of the first and second comparators 83 and 84 are supplied to the set input terminal and the reset input terminal of the flip-flop 85, respectively. The output Q of the flip-flop 85 is supplied to the bases of the transistors 95 and 96.

When the output Q of the flip-flop 85 is set in an L level, the transistor 96 is turned off, so that the constant current I flowing through the transistor 93 flows into the charge/discharge capacitor 98. The charging operation starts, and voltage at the node C rises. On the other hand, when the output Q is set in an open state, the transistor 96 is turned on, so that the node C is grounded through the transistor 96. The discharging operation from the charge/discharge capacitor 98 starts, so that voltage at the node C drops. Thus, depending on a state of the output Q, the charge/discharge capacitor 98 repeats the charging operation and the discharging operation. As a result, a triangle wave voltage appears at the node C.

The operation of the triangle wave oscillator 51 will be described with reference to FIGS. 4(a) to 4(f).

The reference clock signal at 3.58 MHz, generated by the oscillator 60, is quartered in frequency by the frequency divider 62. That is, the frequency divider 62 produces the clock signal A at 895 kHz for transmission to the transistor 104.

During a period T0 from t0 to t1, the clock signal A is in a high (H) level. Accordingly, the transistor 104 is turned on to connect the node G to ground. The node B is set at a voltage (first voltage V1) that is formed by dividing a power source voltage Vcc of the power source 100 by the two resistors 101 and 102.

During a period T1 from t1 to t2, the clock signal A is in a low (L) level. Accordingly, the transistor 104 is turned off to disconnect the node G from ground. The node B is set at a voltage (second voltage V2) that is formed by dividing the power source voltage Vcc of the power source 100 by the resistor 101, and the two resistors 102 and 103. Subsequently, the first voltage V1 and the second voltage V2 alternately appear at the node B in synchronism with the clock signal A, through similar operations.

If the first voltage V1 is set within the following range $$Vref<V1<V2, \ldots \quad (1)$$

a stable triangle wave can be formed. Actually, if it is set close to the second voltage V2, the control range of the external synchronization is narrow. For this reason, it is desired to set the first voltage V1 at a mid point of the range given by the expression (1). The voltage at the mid point is given by the following expression.

$$V1=(Vref+V2)/2 \ldots \quad (2)$$

The first voltage V1 is set to be smaller than the maximum voltage Vmax of the triangle wave voltage to be described later, and the second voltage V2 is set to be larger than the maximum voltage Vmax. The reference voltage Vref of the reference power source 105 is set at the minimum voltage Vmin of the triangle wave voltage.

From the expression (1), the relationship among those voltages Vref, Vmin, Vmax, V1 and V2 can be expressed by the following expression.

$$Vref=Vmin<V1<Vmax<V2 \ldots \quad (3)$$

A specific example of the relationship of those voltages will be given below:

Where Vmax=1.8 V and Vmin=1.0 V, Vcc (voltage of the power source 100)=2.5 V, resistance values of the resistors 101, 102, and 103 are 5 k$\Omega$, 7.5 k$\Omega$, and 12.5 k$\Omega$, V1=1.5 V, V2=2.0 V, and Vref=1.0 V.

A case where a signal appearing at the output Q of the flip-flop 85 takes a waveform of FIG. 4(f), will be described.

For example, during a period T1 from t1 to t2, since the output Q is in a low level, the transistor 96 is turned off, so that the charge/discharge capacitor 98 is charged by the constant current I. Accordingly, the voltage at the node C rises up to the maximum voltage Vmax of the triangle wave voltage. The voltage at the node C will never exceed the voltage at the node B because the second voltage V2, which is larger than the maximum voltage Vmax, is set in the reference voltage switching circuit 82. Accordingly, the output D of the first comparator 83 is in a low level during the period T1.

At time point t2, the state of the output Q is shifted from a low state to an open state. Then, the charge/discharge capacitor 98 starts to discharge, and the voltage at the node C starts to drop. On the other hand, during a period T2 from t2 to t3, as described above, the voltage at the node B is set at the first voltage V1, which is smaller than the maximum voltage Vmax of the triangle wave voltage. Thus, the voltage at the node C is larger than that at the node B during a short period Ta in which the voltage at the node C drops from the maximum voltage Vmax to the first voltage V1. Accordingly, during the period Ta, the output D of the first comparator 83 is placed in an open state as shown in FIG. 4(d).

During the period T2, the charge/discharge capacitor 98 is being discharged, so that the voltage at the node C drops to the minimum voltage Vmin at time point t3. At this time, the voltage at the output E· of the second comparator 84 instantaneously rises as shown in FIG. 4(e) since the reference voltage Vref of the reference power source 105 is set at the minimum voltage Vmin as described above.

The voltage signals at the outputs D and E of the first comparator 83 and the second comparator 84 are applied to the set input and the reset input of the flip-flop 85, respectively. Then, a voltage signal as shown in FIG. 4(f) appears at the output Q of the flip-flop 85. The voltage signal at the output Q is applied to the charge/discharge circuit 81. Consequently, the triangle wave voltage C as shown in FIG. 4(c) appears at the node C.

Thus, if the reference voltage from the reference voltage switching circuit 82 is switched in synchronism with the clock signal A, the oscillation period of the triangle wave voltage C is also synchronized with the clock signal A. Accordingly, the switching operations of the transistors 54a and 54b, which respond to the output signal of the triangle wave oscillator 51, are also synchronized with the clock signal A. This succeeds in removing the beat noise that is due to the fact that the noise unremovable by the smoothing circuits 55a and 55b is not synchronized with the reference clock signal. Eventually, the disturbance of the screen owing to the beat noise is removed, and the characteristics of the VTR are improved.

The waveform of the voltage signal outputted from the triangle wave oscillator 51 is a symmetrical triangle. Accordingly, when the symmetrical triangle wave voltage is compared with a sawtooth wave voltage, both being equal in frequency and amplitude, the former contains a less noise by harmonic components.

In the power source circuit, the oscillating operation of the oscillator circuit is synchronized with a reference clock signal of the external circuit. Because of this, the beat noise that is due to the fact that the noise unremovable by the smoothing circuits is not synchronized with the reference clock signal can be removed. As a result, no deterioration of the external circuit characteristics, no erroneous operation of the power source circuit, and improvement of the reliability of the power source circuit are ensured. Further, since the oscillator circuit generates a triangle wave voltage, the triangle wave voltage contains a less noise by harmonic components than that of a saw-tooth wave voltage.

What is claimed is:

1. A power source comprising:
    an oscillator circuit for outputting a triangle wave voltage;
    a pulse width control circuit for comparing the triangle wave voltage outputted from said oscillator circuit with a reference voltage, and for controlling a width of a pulse signal to be outputted in accordance with a result of the comparison;
    a power source for supplying a power voltage;
    a switching circuit for switching the power voltage on and off in accordance with the pulse signal outputted from said pulse width control circuit to provide a power output signal;
    a smoothing circuit for smoothing the power output signal of said switching circuit, and for applying the smoothed output signal as a constant power source voltage to an external circuit, and as the reference voltage to said pulse width control circuit; and
    a reference clock signal source in the external circuit providing a reference clock signal at a fixed frequency to the oscillator circuit,
    wherein an oscillating operation of said oscillator circuit is synchronized with the reference clock signal from the external circuit.

2. The power source circuit according to claim 1, further comprising a frequency divider for dividing in frequency the reference clock signal of the external circuit to supply the divided reference clock signal to said oscillator circuit.

3. The power source circuit according to claim 1, wherein said pulse width control circuit includes two comparators.

4. The power source circuit according to claim 1, wherein said switching circuit includes a transistor.

5. The power source circuit according to claim 1, wherein said smoothing circuit includes a Schottky diode, a choke coil, and a capacitor.

6. The power source circuit according to claim 1, wherein said oscillator circuit includes:
    a charge/discharge circuit for producing a triangle wave voltage through alternate charging and discharging operations to a charge/discharge capacitor;
    a reference voltage switching circuit for switching one reference voltage to the other and vice versa in accordance with the reference clock signal from the external circuit;
    a first comparator for comparing the triangle wave voltage with an upper limit voltage which is the reference voltage set by said reference voltage switching circuit;
    a second comparator for comparing a predetermined lower limit voltage with the triangle wave voltage; and
    a control circuit for outputting a switch signal for switching the operation of said charge/discharge circuit between the charging operation and the discharging operation in accordance with output signals of said first and second comparators.

7. The power source circuit according to claim 6, wherein said charge/discharge circuit includes a transistor for controlling the alternate charging and discharging operations in accordance with the switch signal from said control circuit.

8. The power source circuit according to claim 6, wherein said reference voltage switching circuit includes a transistor for switching one reference voltage to the other and vice versa in accordance with the reference clock signal from the external circuit.

9. The power source circuit according to claim 6, wherein said control circuit includes a flip-flop.

10. An electronic device comprising a power source circuit and a synchronizing circuit which is supplied with power from said power source circuit and operates in accordance with a reference clock signal, said electronic device comprising:
    a power source circuit including an oscillator circuit for outputting a triangle wave voltage;
    a reference clock signal source providing a reference clock signal at a fixed frequency to the oscillator circuit;
    a pulse width control circuit for comparing the triangle wave voltage outputted from said oscillator circuit with a reference voltage, and for controlling a width of a pulse signal to be outputted in accordance with a result of the comparison;
    a power source for supplying a power voltage;
    a switching circuit for switching the power voltage on and off in accordance with the pulse signal outputted from said pulse width control circuit to provide a power output signal; and
    a smoothing circuit for smoothing the power output signal of said switching circuit, and for applying the smoothed output signal as a constant power source voltage to an external circuit, and as the reference voltage to said pulse width control circuit, wherein an oscillating operation of said oscillator circuit is synchronized with the reference clock signal of said synchronizing circuit.

11. The electronic device according to claim 10, further comprising a frequency divider for dividing in frequency the reference clock signal of the synchronizing circuit to supply the divided reference clock signal to said oscillator circuit.

12. The electronic device according to claim 10, wherein said pulse width control circuit includes two comparators.

13. The electronic device according to claim 10, wherein said switching circuit includes a transistor.

14. The electronic device according to claim 10, wherein said smoothing circuit includes a Schottky diode, a choke coil, and a capacitor.

15. The electronic device according to claim 10, wherein said oscillator circuit includes:

a charge/discharge circuit for producing a triangle wave voltage through alternate charging and discharging operations to a charge/discharge capacitor;

a reference voltage switching circuit for switching one reference voltage to the other and vice versa in accordance with the reference clock signal from said synchronizing circuit;

a first comparator for comparing the triangle wave voltage with an upper limit voltage which is the reference voltage set by said reference voltage switching circuit;

a second comparator for comparing a predetermined lower limit voltage with the triangle wave voltage; and a control circuit for outputting a switch signal for switching the operation of said charge/discharge circuit between the charging operation and the discharging operation in accordance with output signals of said first and second comparators.

16. The electronic device according to claim 15, wherein said charge/discharge circuit includes a transistor for controlling the alternate charging and discharging operations in accordance with the switch signal from said control circuit.

17. The electronic device according to claim 15, wherein said reference voltage switching circuit includes a transistor for switching one reference voltage to the other and vice versa in accordance with the reference clock signal from the synchronizing circuit.

18. The electronic device according to claim 15, wherein said control circuit includes a flip-flop.

* * * * *

UNITED STATES PATENT AND TRADEMARK OFFICE
CERTIFICATE OF CORRECTION

PATENT NO. : 6,087,814
DATED : July 11, 2000
INVENTOR(S) : K. Yamasaki

It is certified that error appears in the above-identified patent and that said Letters Patent is hereby corrected as shown below:

Title page,
Item [56], Reference Cited, U.S. PATENT DOCUMENTS, insert:
-- 4,590,525  5/1986   Komori
   4,630,000  12/1986  Kikuchi
   5,111,133  5/1992   Poulo et al.
   5,221,887  6/1993   Gulczynski
   5,444,592  8/1995   Shimizu et al. --.

Column 5,
Line 25, "Lo" should read -- to --.

Column 6,
Line 64, "E." should read -- E --.

Signed and Sealed this

Thirtieth Day of October, 2001

Attest:

NICHOLAS P. GODICI
Attesting Officer
Acting Director of the United States Patent and Trademark Office